US008634843B2

United States Patent
Gupta et al.

(10) Patent No.: US 8,634,843 B2
(45) Date of Patent: *Jan. 21, 2014

(54) METHODS AND APPARATUS FOR RF CHANNEL SELECTION IN A MULTI-FREQUENCY NETWORK

(71) Applicant: QUALCOMM Incorporated, San Diego, CA (US)

(72) Inventors: Binita Gupta, La Jolla, CA (US); Linbo Li, San Diego, CA (US); Raghuraman Krishnamoorthi, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,765

(22) Filed: Jan. 16, 2013

(65) Prior Publication Data
US 2013/0130705 A1 May 23, 2013

Related U.S. Application Data

(62) Division of application No. 12/051,224, filed on Mar. 19, 2008, now Pat. No. 8,358,986.

(60) Provisional application No. 60/896,253, filed on Mar. 21, 2007, provisional application No. 60/945,308, filed on Jun. 20, 2007.

(51) Int. Cl.
*H04W 72/04* (2009.01)

(52) U.S. Cl.
USPC ........ 455/450; 455/509; 455/161.1; 455/436; 370/331; 370/329

(58) Field of Classification Search
USPC ........... 455/509, 161.1, 179.1, 446, 436, 450, 455/524, 63.3, 515, 456.2, 464, 414; 370/335, 331, 235, 329, 340, 343
See application file for complete search history.

(56) References Cited

U.S. PATENT DOCUMENTS

| 7,421,272 B2 | 9/2008 | Dalsgaard et al. |
| 7,535,882 B2 | 5/2009 | Kim |

(Continued)

FOREIGN PATENT DOCUMENTS

| CN | 1551677 A | 12/2004 |
| EP | 1467586 A2 | 10/2004 |

(Continued)

OTHER PUBLICATIONS

ETSI TS 125 331 v7.3.0; "Universal Mobile Telecommunications System (UMTS); Radio Resource Control (RRC); Protocol Specification (3GPP TS 25.331 v7.3.0 Release 7)," 3GPP Technical Specification, pp. 427(line 32)-429 (line 57), XP014040018, Section 10.2.16k MBMS Neighbouring Cell p-t-m rb Information, ISSN: 0000-001, Dec. 2006.

(Continued)

*Primary Examiner* — Tan Trinh
(74) *Attorney, Agent, or Firm* — The Marbury Law Group, PLLC (57) ABSTRACT

Methods and apparatus for RF channel selection in a multi-frequency network. A method includes identifying selected local operations infrastructures (LOIs) and their neighboring LOIs, generating a neighbor description message (NDM) that identifies the selected LOIs and their neighboring LOIs and associates a descrambling sequence identifier with each RF channel of the selected LOIs and their neighboring LOIs, and distributing the NDM over the selected LOIs. An apparatus includes a message decoder to receive an NDM that identifies RF channels of a first LOI and neighboring LOIs, and wherein each RF channel is associated with a descrambling sequence identifier, and processing logic to detect content acquisition failures, determine a list of RF channels and their associated LOIs that carry desired content, and select a selected RF channel that is associated with a selected LOI that carries the most additional content among the associated LOIs.

40 Claims, 7 Drawing Sheets

(56) References Cited

U.S. PATENT DOCUMENTS

| | | | |
|---|---|---|---|
| 7,660,275 | B2 | 2/2010 | Vijayan et al. |
| 7,706,328 | B2 | 4/2010 | Mukkavilli et al. |
| 8,280,368 | B2 | 10/2012 | Mantravadi et al. |
| 8,358,986 | B2 | 1/2013 | Gupta et al. |
| 2003/0134622 | A1* | 7/2003 | Hsu et al. .................. 455/414 |
| 2004/0202140 | A1 | 10/2004 | Kim et al. |
| 2006/0120523 | A1 | 6/2006 | Kurotaki |
| 2007/0010251 | A1 | 1/2007 | Cho et al. |
| 2008/0095122 | A1* | 4/2008 | Khandekar et al. ........... 370/335 |
| 2008/0253331 | A1* | 10/2008 | Gupta et al. .................. 370/331 |
| 2008/0259858 | A1 | 10/2008 | Gupta et al. |
| 2008/0259911 | A1 | 10/2008 | Gupta et al. |
| 2009/0010225 | A1 | 1/2009 | Gupta |
| 2009/0016380 | A1 | 1/2009 | Gupta et al. |
| 2009/0029709 | A1 | 1/2009 | Gupta et al. |
| 2009/0080378 | A1* | 3/2009 | Gupta et al. .................. 370/329 |
| 2009/0197604 | A1* | 8/2009 | Gupta et al. .................. 455/436 |
| 2009/0199244 | A1 | 8/2009 | Woch et al. |
| 2009/0225872 | A1 | 9/2009 | Simon |
| 2009/0274119 | A1* | 11/2009 | Gupta et al. .................. 370/331 |
| 2010/0056166 | A1* | 3/2010 | Tenny .......................... 455/450 |
| 2011/0038350 | A1* | 2/2011 | Gholmieh et al. ............ 370/331 |

FOREIGN PATENT DOCUMENTS

| | | |
|---|---|---|
| EP | 1513368 A2 | 3/2005 |
| GB | 2407002 A | 4/2005 |
| JP | 2002353915 A | 12/2002 |
| JP | 2009522947 A | 6/2009 |
| KR | 20040077725 | 9/2004 |
| KR | 20040087830 A | 10/2004 |
| WO | 03063418 | 7/2003 |
| WO | 03065751 | 8/2003 |
| WO | 2005011157 | 2/2005 |
| WO | 2005043829 | 5/2005 |
| WO | 2005055473 A1 | 6/2005 |
| WO | 2005117297 A1 | 12/2005 |
| WO | 2006014092 A1 | 2/2006 |
| WO | 2006110445 A1 | 10/2006 |
| WO | 2006134449 A2 | 12/2006 |

OTHER PUBLICATIONS

International Search Report, PCT/US08/057944, International Search Authority. European Patent Office, Aug. 22, 2008.

Maeda S., "4-5 Multichannel Broadcast Service for Cellular Phones: MediaFLO," Institute of Image Information and Television Engineers, May 1, 2006, pp. 725-727, vol. 60 (5), Japan.

Mayeda S., "Mobile Communication Technology and Mobile Application Provided by Qualcomm," Japan, Qualcomm Japan Incorporated, Sep. 8, 2006, pp. 18-27, URL, http://www.veriserve.co.jp/jp/seminer/seminer_list/pdf/06.09.08_maeda.pdf.

QUALCOMM Proprietary, "MediaFLO", Jul. 26, 2006, URL, http://wiki.nectec.or.th/gitiwiki/pub/Knowledge/PresentationFromICTExpoForum/mediaflo.pdf.

Taiwan Search Report—TW097110310—TIPO—Sep. 1, 2012.

TIA-1099,"Forward Link Only Air Interface Specification for Terrestrial Mobile Multimedia Multicast" Oct. 2006.

Written Opinion, PCT/US08/057944, International Search Authority, European Patent Office, Aug. 22, 2008.

Kaaranen, H., et al., "UMTS Networks, Architecture, Mobility and Services, passage" UMTS Networks: Archictecture, Mobility and Services, Wiley, US, Jan. 1, 2001, pp. 47-50, 55-57, 64, 90, XP002491350.

* cited by examiner

METHODS AND APPARATUS FOR RF CHANNEL SELECTION IN A MULTI-FREQUENCY NETWORK

CROSS-REFERENCE TO RELATED APPLICATIONS

The present application is a divisional of application Ser. No. 12/051,224, filed Mar. 19, 2008, which claims priority to Provisional Application No. 60/896,253 entitled "METHODS AND APPARATUS FOR PROVIDING NEIGHBOR LIST DATA IN A MULTIPLE FREQUENCY NETWORK," filed Mar. 21, 2007, and to Provisional Application No. 60/945,308, entitled, "METHODS AND APPARATUS FOR PROVIDING NEIGHBOR LIST DATA IN A MULTIPLE FREQUENCY NETWORK," filed Jun. 20, 2007, all of which are assigned to the assignee hereof and hereby expressly incorporated by reference herein.

BACKGROUND

1. Field

The present application relates generally to the operation of data networks, and more particularly, to methods and apparatus for RF channel selection in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs) (or RF channels) are used to transmit media content. One type of MFN is a horizontal multi-frequency network (HMFN) where a distribution waveform is transmitted over different RF channels in different local areas. The same or different content may be transmitted as part of distribution waveforms carried over different RF channels in such local areas. Another type of MFN is a vertical multi-frequency network (MFN) in which multiple radio frequency (RF) channels are used in a given local area to transmit independent distribution waveforms with an aim to increase the capacity of the network (in terms of the ability to deliver more content to a device/end user). An MFN deployment may also consist of VMFN in certain areas and HMFN in certain other areas.

In a typical VMFN, a local operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

During operation, a receiving device may perform an RF channel switch as a result of a user request or an application request to acquire content on another RF channel. The device may also perform an RF channel switch if content acquisition failure happens for desired content e.g. due to device mobility. The device mobility is defined as the device moving from the coverage area of the current LOI to the coverage area of other neighboring LOIs. The content acquisition failure can also happen due to varying channel conditions without involving device mobility. Typically, the device may switch to any available RF channel that carries the desired content flow. In the case of content acquisition failure due to device mobility, the coverage areas of two or more LOIs may overlap so that multiple RF channels may be available that carry the desired content. These available RF channels belong to different LOIs, and each LOT may comprise a wide variety of additional content carried on other RF channels. If the device randomly selects an RF channel that carries the desired content from the available RF channels, the LOI associated with the selected RF channel may not carry the most additional content. For example, the LOI associated with the selected RF channel may carry less content than LOIs associated with other available RF channels.

Therefore, it would be desirable to have a system that operates to allow a device to select an RF channel carrying the desired content that is associated with a LOI that has the most additional content, thereby providing the device with the ability to switch to the additional content in a fast and efficient manner for an enhanced user experience.

SUMMARY

In one or more aspects, a selection system, comprising methods and apparatus, is provided that operates to select an RF channel having a desired content flow and that is available in a LOI having the most additional content flows in a multi-frequency network. After the RF channel switch, the device can receive the desired content flow and has the ability to switch to the additional content flows in a fast and efficient manner. This provides access to the maximum number of additional content flows to a device end user for an enhanced user experience.

In an aspect, a method is provided for RF channel selection in a multi-frequency network. The method comprises identifying one or more selected LOIs and one or more neighboring LOIs for each of the one or more selected LOIs in the multi-frequency network and generating a neighbor description message (NDM) that identifies the one or more selected LOIs and their respective neighboring LOIs and associates at least one descrambling sequence identifier with each RF channel associated with each of the one or more selected LOIs and their respective neighboring LOIs. The method also comprises distributing the NDM over each of the one or more selected LOIs.

In an aspect, an apparatus is provided for RF channel selection in a multi-frequency network. The apparatus comprises messaging logic configured to identify one or more selected LOIs and one or more neighboring LOIs for each of the one or more selected LOIs in the multi-frequency network, generate an NDM that identifies the one or more selected LOIs and their respective neighboring LOIs, and associate at least one descrambling sequence identifier with each RF channel associated with each of the one or more selected LOIs and their respective neighboring LOIs. The apparatus also comprises output logic configured to distribute the NDM over the one or more selected LOIs.

In an aspect, an apparatus is provided for RF channel selection in a multi-frequency network. The apparatus comprises means for identifying one or more selected LOIs and one or more neighboring LOIs for each of the one or more selected LOIs in the multi-frequency network, means for generating an NDM that identifies the one or more selected LOIs and their respective neighboring LOIs, and associates at least one descrambling sequence identifier with each RF channel associated with each of the one or more selected LOIs and their respective neighboring LOIs, and means for distributing the NDM over the one or more selected LOIs.

In an aspect, a computer program product is provided for RF channel selection in a multi-frequency network. The computer program product comprises a machine-readable medium that comprises a first set of codes for causing a computer to identify one or more selected LOIs and one or more neighboring LOIs for each of the one or more selected LOIs in the multi-frequency network, generate an NDM that identifies the one or more selected LOIs and their respective neighboring LOIs, and associate at least one descrambling sequence identifier with each RF channel associated with each of the one or more selected LOIs and their respective neighboring LOIs, and a second set of codes for causing the computer to distribute the NDM over the one or more selected LOIs.

In an aspect, an integrated circuit is provided that is configured for RF channel selection in a multi-frequency network. The integrated circuit comprises a first module configured to identify one or more selected LOIs and one or more neighboring LOIs for each of the one or more selected LOIs in the multi-frequency network, generate an NDM that identifies the one or more selected LOIs and their respective neighboring LOIs, and associate at least one descrambling sequence identifier with each RF channel associated with each of the one or more selected LOIs and their respective neighboring LOIs, and a second module configured to distribute the NDM over the one or more selected LOIs.

In an aspect, a method is provided for RF channel selection in a multi-frequency network. The method comprises receiving an NDM that identifies RF channels associated with a first LOI and one or more neighboring LOIs of the first LOI, and wherein each RF channel is associated with at least one descrambling sequence identifier, and detecting content acquisition failures associated with desired content. The method also comprises determining a list of RF channels carrying the desired content and their associated LOIs from the one or more neighboring LOIs, and selecting a selected RF channel from the list of RF channels, wherein the selected RF channel is associated with a selected LOI that carries the most additional content among the associated LOIs.

In an aspect, an apparatus is provided for RF channel selection in a multi-frequency network. The apparatus comprises a message decoder configured to receive an NDM that identifies RF channels associated with a first LOI and one or more neighboring LOIs of the first LOI, and wherein each RF channel is associated with at least one descrambling sequence identifier. The apparatus also comprises processing logic configured to detect content acquisition failures associated with desired content, determine a list of RF channels carrying the desired content and their associated LOIs from the one or more neighboring LOIs, and select a selected RF channel from the list of RF channels, wherein the selected RF channel is associated with a selected LOI that carries the most additional content among the associated LOIs.

In an aspect, an apparatus is provided for RF channel selection in a multi-frequency network. The apparatus comprises means for receiving an NDM that identifies RF channels associated with a first LOI and one or more neighboring LOIs of the first LOI, and wherein each RF channel is associated with at least one descrambling sequence identifier, and means for detecting content acquisition failures associated with desired content. The apparatus also comprises means for determining a list of RF channels carrying the desired content and their associated LOIs from the one or more neighboring LOIs, and means for selecting a selected RF channel from the list of RF channels, wherein the selected RF channel is associated with a selected LOI that carries the most additional content among the associated LOIs.

In an aspect, a computer program product is provided for RF channel selection in a multi-frequency network. The computer program product comprises a machine-readable medium that comprises a first set of codes for causing a computer to receive an NDM that identifies RF channels associated with a first LOI and one or more neighboring LOIs of the first LOI, and wherein each RF channel is associated with at least one descrambling sequence identifier, a second set of codes for causing the computer to detect content acquisition failures associated with desired content, a third set of codes for causing the computer to determine a list of RF channels carrying the desired content and their associated LOIs from the one or more neighboring LOIs, and a fourth set of codes for causing the computer to select a selected RF channel from the list of RF channels, wherein the selected RF channel is associated with a selected LOI that carries the most additional content among the associated LOIs.

In an aspect, at least one integrated circuit is provided that is configured to perform a method for RF channel selection in a multi-frequency network. The at least one integrated circuit comprises a first module configured to receive an NDM that identifies RF channels associated with a first LOI and one or more neighboring LOIs of the first LOI, and wherein each RF channel is associated with at least one descrambling sequence identifier, a second module configured to detect content acquisition failures associated with desired content, a third module configured to determine a list of RF channels carrying the desired content and their associated LOIs from the one or more neighboring LOIs, and a fourth module configured to select a selected RF channel from the list of RF channels, wherein the selected RF channel is associated with a selected LOI that carries the most additional content among the associated LOIs.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a selection system is provided that operates to allow a device to select an RF channel in a multi-frequency network. In an aspect, the selection system aggregates descrambling sequence identifiers associated with RF channels in a particular LOI and its neighboring LOIs into a neighbor description message. The system generates an NDM for each LOI (or for a selected group of LOIs) in the vertical multi-frequency network. The NDMs are then distributed to transmitters in respective LOIs, which in turn transmit the NDMs to devices in their coverage areas.

It is bandwidth efficient to generate an NDM for each LOI, however an NDM may be generated for a group of LOIs to simplify NDM generation and distribution logic within the selection system. When the NDM is generated for a group of LOIs, it includes descrambling sequence identifiers associated with RF channels in each LOI (within the group of LOIs) and its neighboring LOIs. The NDM generated for a group of LOIs is distributed to transmitters in each LOI within the group of LOIs. Transmitters in turn transmit the received NDMs to devices in their coverage areas.

A device receiving an NDM can determine the set of neighboring LOIs of the current LOI and descrambling sequences associated with RF channels used in its current LOI and its neighboring LOIs. During an RF channel switch initiated after content acquisition failure e.g. because of device mobility when the device moves from a region covered by its current LOI to a region covered by one or more neighboring LOIs, the selection logic at the device processes the received NDM to quickly and efficiently determine an RF channel in a neighbor LOI carrying the desired content and descrambling sequence associated with that RF channel. This will allow a smooth handoff to occur from a content acquisition perspective. If there are multiple neighboring LOIs that have RF channels that carry the desired content, the selection logic operates to select the RF channel associated with a neighboring LOI having the most additional content. Thus, after the RF switch to the selected RF channel, the device has access to the additional content, which can be switched to in a fast and efficient manner to provide an enhanced user experience.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

DEFINITIONS

The following definitions are used herein to describe aspects of a selection system.
1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs.
8. RF Channel—Refers to an RF frequency that is used to convey a content distribution waveform over a selected LOI.
9. Content Channel—Refers to selected content flows within a particular distribution waveform. For example, a distribution waveform may comprise multiple content channels and each content channel may comprise one or more content flows.

ACRONYMS

Figure 1:
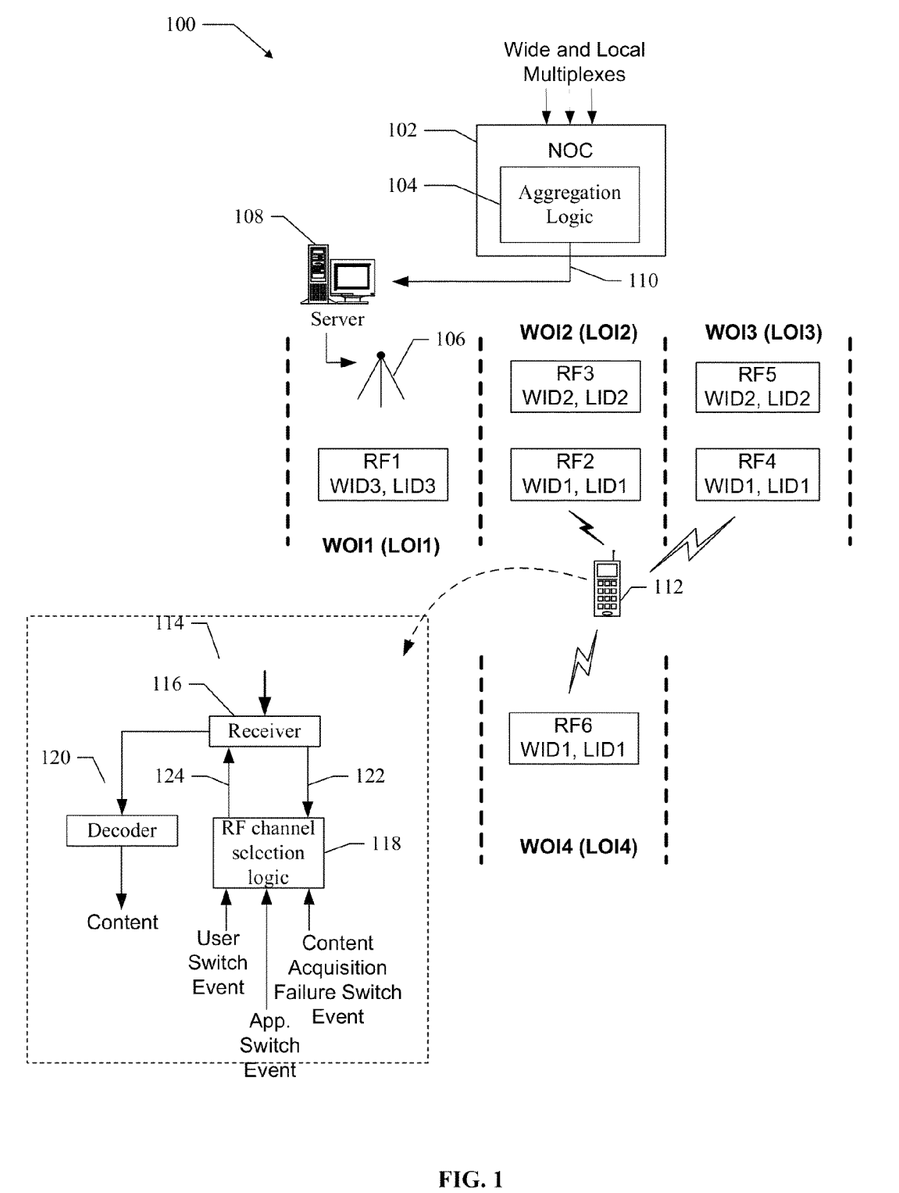
FIG. 1 shows a network that illustrates how descrambling sequence identifiers are provisioned in multiple LOIs of a MFN for use in aspects of a selection system.

The following acronyms are used herein to describe aspects of a selection system.
LM—Local Area Multiplex
WM—Wide Area Multiplex
NOC—Network Operations Center
LOI—Local Operations Infrastructure
NDM—Neighbor Description Message
WID—Wide Area Descrambling Identifier
LID—Local Area Descrambling Identifier
Introduction FIG. 1 shows a network 100 that illustrates how WID/LID descrambling sequence identifiers are provisioned in multiple LOIs for use in aspects of a selection system. For example, the network 100 comprises four WOIs (WOI1, WOI2, WOI3, and WOI4) each comprising one LOI (LOI1, LOI2, LOI3, and LOI4, respectively) of a multi-frequency network. Within each LOI, one or more RF channels are used to transmit content. Each RF channel has an associated WID/LID that identifies descrambling sequences that can be used to descramble content transmitted on that RF channel. LOI1, LOI2, LOI3, and LOI4 are neighboring LOIs as shown in network 100. The LOI1 has LOI2 as its neighbor, the LOI2 has LOI1, LOI3 and LOI4 as its neighbors, the LOI3 has LOI2 as its neighbor and LOI4 has LOI2 as its neighbors.

The network 100 comprises a network operations center (NOC) 102 that operates to receive wide and local content multiplexes for distribution over selected wide and local areas of a multi-frequency network. The NOC 102 also operates to configure the multi-frequency network to distribute that content. To accomplish this, the NOC 102 is aware of the geographic regions of the network that are covered by the LOIs, the RF channels used in each region, and any other network information that may be needed to configure the network and distribute the wide and local area content multiplexes. It should be noted that the network 100 may comprise any number of LOIs.

In an aspect, the NOC 102 comprises aggregation logic 104. The aggregation logic 104 operates to aggregate information relating to the list of neighboring LOIs for each LOI and the WID/LID descrambling identifiers that are associated with the RF channels in each LOI. For example, the wide and local area content multiplexes are scrambled with wide area and local area scrambling sequences before transmission over the network 100. In an aspect, the aggregation logic 104 operates to generate NDM messages that are configured to provide a list of neighboring LOIs associated with a particular LOI and WID/LID identifiers that identify descrambling sequences associated with RF channels of the particular LOI and its neighboring LOIs. In another aspect, the NDM messages are configured to provide a list of neighboring LOIs and WID/LID identifiers associated with RF channels for any selected group of LOIs. A more detailed description of the NDM messages generated by the aggregation logic 104 is provided in another section of this document.

The NOC 102 operates to transmit the wide and local area multiplexes and the generated NDMs to the LOIs in the network 100. It should be noted that although only four LOIs are shown, the NOC 102 may transmit the multiplexes and associated NDMs to any number of LOIs.

In an aspect, the LOI1, LOI2, LOI3, and LOI4 comprise one or more transmitter sites. For example, the LOI1 comprises transmitter site 106. Each transmitter site operates to transmit a distribution waveform on a selected RF channel over its respective LOI. It should be noted that each transmitter site comprises one or more servers as illustrated at 108.

In an aspect, the NOC 102 operates to transmit the content multiplexes and the NDMs to the transmitter sites using any suitable transport mechanism. For example, the content multiplexes and the NDMs are transmitted to servers associated with each transmitter site, as illustrated at 110. In an aspect, the NOC 102 transmits the content multiplexes and the NDM messages to the transmitter sites using an MPEG-2 transport mechanism. In this configuration, the multiplexes and NDM messages are assigned MPEG-2 transport identifiers so that servers at each transmitter site can detect and receive selected content multiplexes and an NDM message which are directed to them, respectively.

The servers at the transmitter sites use the transport identifiers to determine which multiplexes and NDM message are intended for them to distribute over their respective LOIs. The servers then operate to pack their respective multiplexes and the NDM message into transmission frames for transmission over selected RF channels. The servers utilize any suitable physical layer process to pack the multiplexes and the NDM message into the transmission frames for transmission. By using the transport identifiers to determine the multiplexes and the NDM message intended for transmission over their respective LOIs, the servers at the transmitter sites need not decode any of the multiplexes or NDM messages. The servers simply detect the appropriate transport identifiers and then pack the identified multiplexes and the NDM message into the transmission frames according to the physical layer process.

The transmission frames comprise content flows associated with the wide and local area multiplexes and the NDM message generated by the aggregation logic 104. In an aspect, the transmission frames comprise wide and local data partitions that are used to convey the wide and local area content flows, respectively. In addition, the wide and local partitions comprise wide and local control channels. In an aspect, the local control channel is used to distribute the NDM message generated by the aggregation logic 104 to the devices in each LOI.

In an aspect, the transmitter sites transmit transmission frames over their respective LOIs using the designated RF channels. By using multiple RF channels, the network 100 is able to transmit more content flows over such LOIs. It should be noted that the transmitter sites within a LOI may be co-located or separated by any desired distance. It should also be noted that the NDMs distributed over each LOI may be different because each LOI may have a different set of neighbor LOIs and each neighbor may be associated with different RF channels and descrambling sequences with which to descramble the transmitted content.

Within each LOI, descrambling sequence identifiers are associated with each RF channel. The descrambling sequence identifiers comprise wide area descrambling sequence identifiers (WID) and local area descrambling sequence identifiers (LID). The descrambling sequence identifiers identify descrambling sequences that can be used to descramble content received in a particular LOI on a particular RF channel. For example, in LOI2 there are two RF channels (i.e., RF2, RF3) and each RF channel is associated with descrambling sequence identifiers. For example, RF2 is associated with WID1 and LID1, and RF3 is associated with WID2 and LID2.

A device 112 operating in the LOI2 is tuned to receive wide area content on channel RF2 that can be descrambled with a descrambling sequence identified by WID1. Details of the device 112 are shown at 114. The device 112 comprises a receiver 116 that operates to tune to a selected RF channel to receive transmission frames. For example, the receiver 116 is tuned to RF2 in LOI2 to receive transmission frames. The transmission frames that are received comprise a local control channel that conveys an NDM generated by the aggregation logic 104 for LOI2. The NDM comprises the list of neighboring LOIs for the current LOI (i.e. LOI2) and WID/LID descrambling identifiers that identify descrambling sequences that are associated with RF channels in the current LOI (i.e., LOI2) and its neighboring LOIs (i.e., LOI1, LOI3 and LOI4).

The receiver 116 passes the received NDM to RF channel selection logic 118, as illustrated at 122. The receiver 116 also descrambles the received content using the correct WID/LID identifiers associated with RF2 in LOI2 and passes the descrambled content to a decoder 120 that operates to render the content for the device user.

The RF channel selection logic 118 operates to receive the NDM at 122. The NDM specifies a list of neighboring LOIs for a given LOI and WID/LID identifiers for RF channels in the given LOI and its neighboring LOIs. From this information, the RF channel selection logic 118 operates to store the mappings between RF channels and WID/LID descrambling identifiers used in the current LOI and each neighboring LOI of the current LOI. In an aspect, one or more RF channel switch events may occur that will cause the RF channel selection logic 118 to send a request 124 to the receiver 116 to tune to a new RF channel. The RF channel switch events are events that cause the device 112 to switch from one RF channel to another RF channel to receive a desired content flow. In an aspect, an RF channel switch event can be initiated by a device user request, a request generated by an application program executing at the device 112, and as a result of content acquisition failure for desired content (e.g. due to device mobility).

In an aspect, device mobility occurs when the device 112 moves from a region covered by LOI2 to a region covered by one or more neighboring LOIs. For example, the device receiver 116 is tuned to receive a desired content flow on a particular RF channel in LOI2. The RF channel selection logic 118 operates to determine an RF channel in a neighboring LOI that the receiver 116 can tune to in order to continue to receive the desired content flow when the content acquisition failure is detected for the desired content as the device 112 moves outside the coverage area of LOI2.

To determine a new RF channel carrying the desired content flow, the RF channel selection logic 118 operates to perform one or more of the following functions in aspects of the selection system.

1. Determine (from information in a received NDM) a list of available RF channels in neighboring LOIs that carry the desired content flow so that a smooth transition can be performed from the content acquisition perspective.

2. Filter the list of available RF channels by measured signal strength to determine a subset of RF channels which can be received with sufficient signal strength to allow content acquisition.
3. Order the filtered subset of RF channels by their associated LOIs based on the number of unique WID/LID identifiers associated with RF channels in each LOI. The number of unique WIDs and LIDs associated with RF channels in a LOI identifies the amount of available content in that LOI.
4. Select an RF channel from the ordered subset of RF channels that is associated with the LOI having the most number of unique WID/LID identifiers (which indicates most additional content).
5. If none of the RF channels in the list of available RF channels meet the desired signal strength criteria, then select the RF channel from the list of available RF channels that can be received with the highest signal strength.

Once the RF channel is determined, the RF channel selection logic 118 outputs a channel switch message 124 to the receiver 116 to implement the channel switch. The channel switch message contains the correct WID/LID identifiers for the selected RF channel so that the desired content flow can be descrambled by the receiver 116. The receiver 116 performs an RF switch to the selected RF channel and descrambles content using the WID/LID received in the channel switch message.

Therefore, in various aspects, the selection system operates to determine which of the available RF channels carries a desired content flow and is available in a LOI that carries the most additional content flows that may be quickly and efficiently switched to in the future based on user or application requests. This maximizes content availability in the device's new area and provides for an enhanced user experience.

Content Acquisition Failure Example

Referring again to FIG. 1, the following example describes the operation of aspects of a selection system after content acquisition failure is detected for desired content (e.g. due to device mobility). For example, it will be assumed that the device 112 is currently tuned to receive wide area content carried by channel RF2 of LOI2 and has received an NDM over a local control channel. The wide area content can be descrambled using a descrambling sequence identified by WID1. It will further be assumed that as the device 112 moves out of the region covered by LOI2, content acquisition failures are detected for wide area content by the RF channel selection logic 118. The RF channel selection logic 118 operates to determine from the NDM a list of available RF channels in the neighboring LOIs of LOI2 that also carry the wide area content carried by RF2 and that can be descrambled using a descrambling sequence identified by WID1. Specific wide area content is descrambled using the same descrambling sequence identifier over multiple RF channels in neighboring LOIs. In this example, it is determined that channel RF4 in LOI3 and channel RF6 in LOI4 carry same wide area content as RF2 in LOI2 and these can be descrambled using a descrambling sequence identified by WID1.

The RF channel selection logic 118 communicates with the receiver 116 to determine the signal strength for the set of available RF channels (RF4 and RF6) carrying the desired content. For example, the RF channel selection logic 118 uses the measured signal strength to determine which of the identified RF channels meets any desired signal strength criteria. The RF channel selection logic 118 filters the available RF channels to determine a subset of RF channels which meet sufficient signal strength criteria.

The RF channel selection logic 118 then sorts the filtered list of available RF channels by the number of unique WID/LID identifiers associated with their respective LOIs. The number of unique WID/LID identifiers indicates the amount of content available in a particular LOI. For example, the LOI having the most number of unique WID/LID identifiers is determined to carry the most additional content. The RF channel selection logic 118 then selects the RF channel associated with the LOI having the most additional content from the filtered list of available RF channels.

The RF channel selection logic 118 then sends a channel switch message 124 to the receiver 116 to switch to the determined RF channel. If all available RF channels in the list carry the same amount of additional content in their associated LOI, then the RF channel with the highest signal strength is selected. Also, if none of the available RF channels meet the signal strength criteria, then the RF channel with the highest signal strength is selected. In this example, assuming both RF4 and RF6 meet the signal strength criteria, RF4 of LOI3 is selected because LOI3 has the most additional content (i.e., most number of unique WID/LID identifiers). However, if the signal strength of RF4 did not meet the desired signal strength criteria, RF6 of LOI4 would be selected. Thus, by switching to channel RF4 of LOI3 the device can continue to receive the desired wide area content and will have fast and efficient access to additional content carried in LOI3.

Therefore, aspects of the selection system operate to select an RF channel that carries the desired content and is associated with the neighboring LOI that has the most additional content available. It should be noted that the network 100 illustrates just one implementation of a selection system and that other implementations are possible within the scope of the various aspects.

Figure 2:
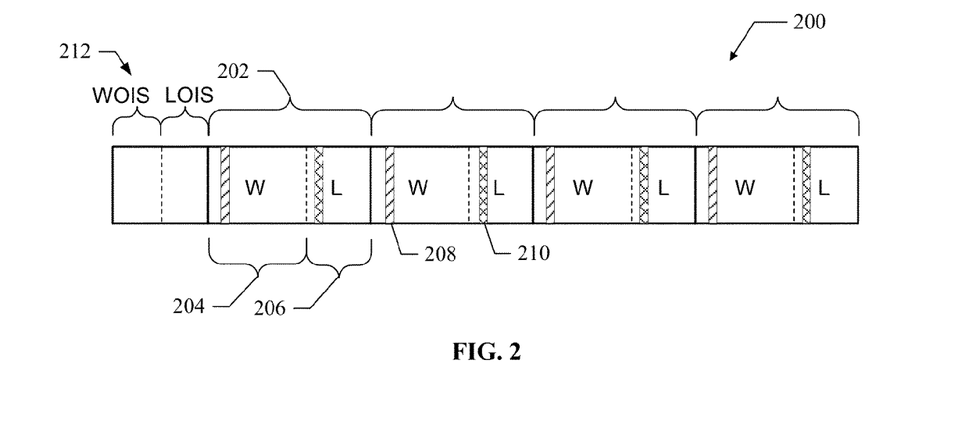
FIG. 2 shows a diagram of a transmission frame for use in aspects of a selection system.

FIG. 2 shows a diagram of a transmission frame 200 for use in aspects of a selection system. For example, the transmission frame 200 may be packed with wide and local area content multiplexes and an NDM message, and transmitted by one or more of the transmitter sites of FIG. 1.

The transmission frame 200 comprises four sub-frames, shown generally at 202, that are used to convey wide and local area content multiplexes. For example, each sub-frame 202 comprises a wide area partition 204 that is packed with a wide area content multiplex, and a local area partition 206 that is packed with a local area content multiplex.

Included in the wide area partition 204 is a wide area control channel 208. The wide area control channel 208 operates to convey messages pertaining to the wide area content multiplex. Included in the local area partition 206 is a local area control channel 210. The local area control channel 210 operates to convey messages pertaining to the local area content multiplex. In an aspect, the local area control channel is used to convey the NDM message.

At the start of the transmission frame 200 are overhead information symbols (OIS) 212 that provide overhead information that is used to locate the wide area control channel, the local area control channel, and the wide and local area content multiplexes that are packed into the sub-frames 202. The OIS 212 comprises wide overhead information symbols (WOIS) and local overhead information symbols (LOIS).

Figure 3:
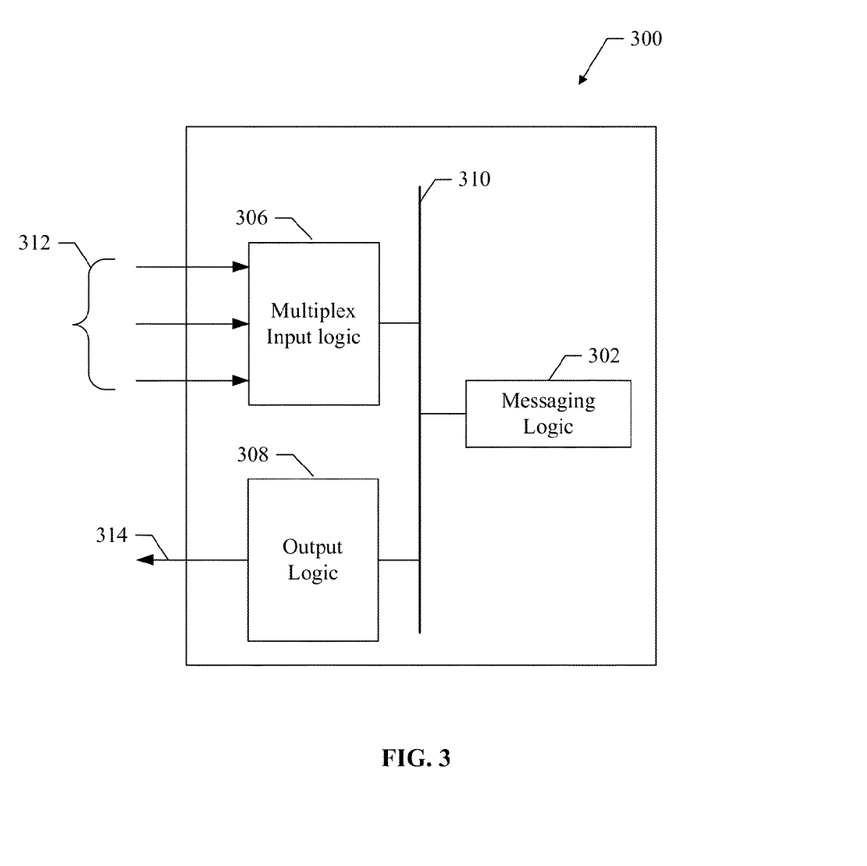
FIG. 3 shows aggregation logic for use in aspects of a selection system.

FIG. 3 shows aggregation logic 300 for use in aspects of a selection system. For example, the aggregation logic 300 is suitable for use as the aggregation logic 104 shown in FIG. 1. The aggregation logic 300 comprises messaging logic 302, multiplex input logic 306, and output logic 308 all coupled to a data bus 310.

The multiplex input logic 306 comprises at least one of a CPU, processor, gate array, hardware logic, memory elements, and/or hardware executing software. The multiplex input logic 306 operates to receive one or more wide and/or local area multiplexes 312 that are to be distributed over wide and local regions of a multi-frequency distribution network.

The messaging logic 302 comprises at least one of a CPU, processor, gate array, hardware logic, memory elements, and/or hardware executing software. The messaging logic 302 operates to generate messages for use in aspects of the selection system. The messaging logic 302 has access to the neighboring relationship information among LOIs in the multi-frequency distribution network. In an aspect, the messaging logic 302 generates one or more NDM messages that identify one or more neighboring LOIs for a given LOI and WID/LID descrambling sequence identifiers associated with RF channels used in the given LOI and its neighboring LOIs. In another aspect, the messaging logic 302 generates an NDM message for any selected group of LOIs. A more detailed description of the NDM message is provided in another section of this document.

The output logic 308 comprises at least one of a CPU, processor, gate array, hardware logic, memory elements, and/or hardware executing software. The output logic 308 operates to output content multiplexes and NDM messages for distribution to LOIs in a multi-frequency network. For example, the output logic 308 operates to output content multiplexes and NDM messages to transmitter sites in a multi-frequency network using any type of transport mechanism.

In an aspect, the selection system comprises a computer program product having one or more program instructions ("instructions") or sets of "codes" embodied or stored on a machine-readable medium, which when executed by at least one processor, for instance, a processor at the messaging logic 302, provides the functions described herein. For example, the sets of codes may be loaded into the aggregation logic 300 from a machine-readable medium, such as a floppy disk, CDROM, memory card, FLASH memory device, RAM, ROM, or any other type of memory device or machine-readable medium that interfaces to the aggregation logic 300. In another aspect, the sets of codes may be downloaded into the aggregation logic 300 from an external device or network resource. The sets of codes, when executed, provide aspects of a selection system as described herein.

Figure 4:
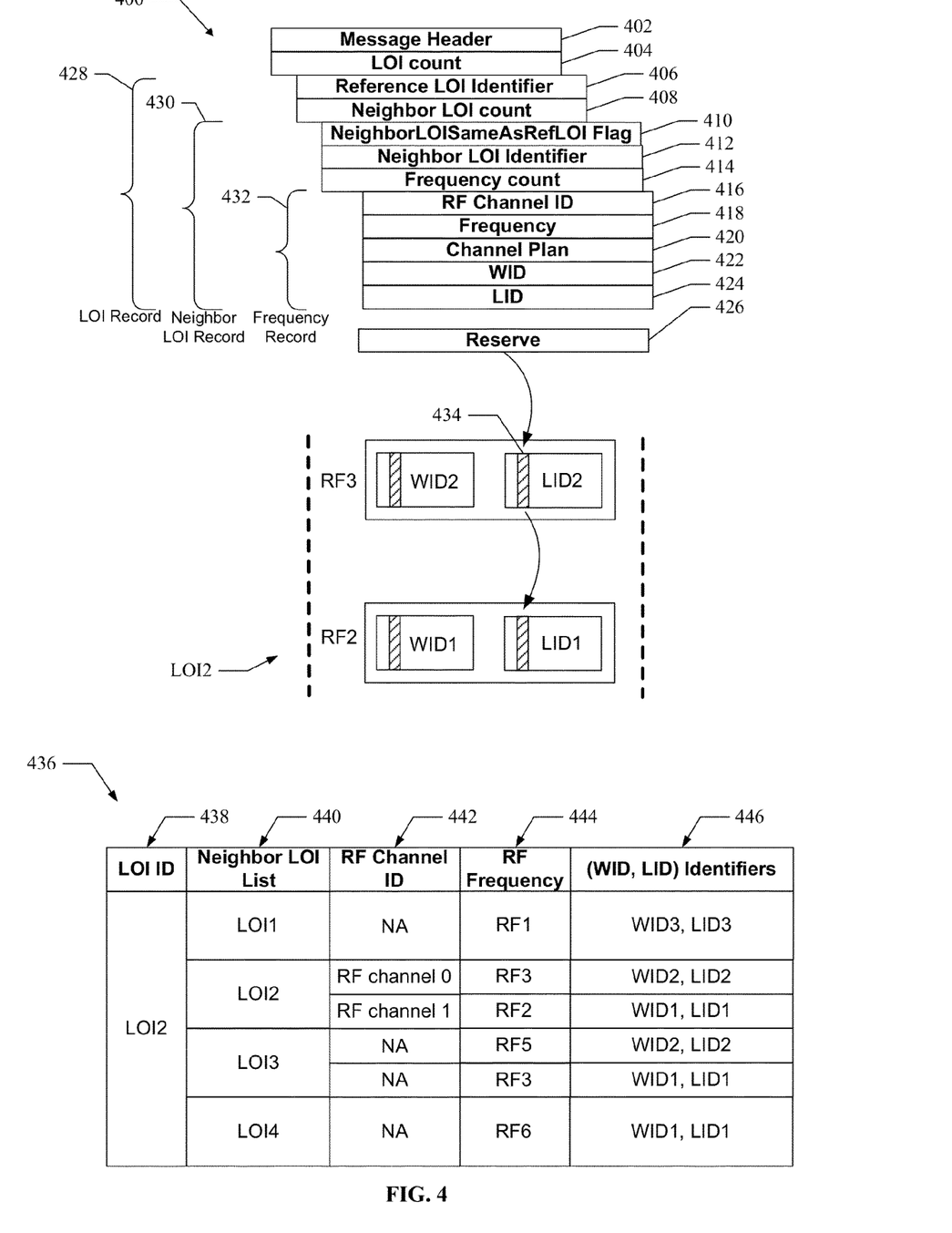
FIG. 4 shows a diagram that illustrates a neighbor description message for use in aspects of a selection system.

FIG. 4 shows a diagram that illustrates a neighbor description message 400 for use in aspects of a selection system. For example, the NDM 400 is generated by the messaging logic 302 shown in FIG. 3.

In an aspect, the NDM 400 is generated separately for each LOI and is configured to provide a list of RF channels associated with a selected LOI and its neighboring LOIs. In another aspect, the NDM 400 is generated for a selected group of LOIs (which may or may not be neighbors), and includes all neighboring LOIs for each of the LOI within the selected group of LOIs. Each of the RF channels described in the NDM 400 is associated with WID/LID descrambling identifiers. The following is a description of the parameters included in the NDM 400.

The NDM 400 comprises a message header 402 which identifies the NDM message 400. The NDM 400 also comprises a LOI count parameter 404 that indicates the number of LOIs for which a set of neighboring LOIs, associated RF channels, and WID/LID identifier information is described in the NDM 400. For each LOI count 404, a LOI record 428 is included containing the group of parameters as indicated by the bracket. For example, if the LOI count parameter 404 is equal to "2", there will be two sets of LOI records 428.

As part of the LOI record 428, a Reference LOI identifier parameter 406 is provided that identifies a particular reference LOI. A neighbor LOI count parameter 408 is provided that indicates the total number of neighboring LOIs associated with the reference LOI plus the reference LOI itself. For each neighbor LOI count 408, a Neighbor LOI record 430 is included containing the group of parameters as indicated by the bracket. For example, if the neighbor LOI count parameter 408 is equal to "2", there will be two sets of Neighbor LOI records 430. The Neighbor LOI record 430 provides RF channels and WID/LID information associated with a given LOI.

As part of the Neighbor LOI record 430, a NeighborLOISameAsRefLOI flag 410 is provided which indicates whether a particular Neighbor LOI record 430 is for the Reference LOI. If this flag is set to true, a Neighbor LOI Identifier field 412 may be omitted for optimization. The Neighbor LOI Identifier 412 is provided that identifies the particular LOI for which information is being described in the Neighbor LOI Record 430. A frequency count parameter 414 is provided that indicates how many frequencies (i.e., RF channels) are associated with the identified LOI. For each RF channel in the identified LOI, a Frequency record 432 is included containing the group of parameters as indicated by the bracket. For example, if the Frequency count parameter 414 is equal to "2", there will be two sets of Frequency records 432.

As part of the Frequency record 432, an RF Channel ID parameter 416 is provided that indicates an identifier for a particular RF channel. This parameter may be used to reference to a particular RF channel in other control channel messages. In an aspect, the RF Channel ID parameter 416 is only included for RF channels in the reference LOI. For example, the RF channel ID parameter 416 is only included for the reference LOI and therefore will only be present in Frequency records associated with the Neighbor LOI Record 430 for which the NeighborLOISameAsRefLOI flag 410 is set to true. A frequency parameter 418 is provided that indicates a particular transmission frequency. A channel plan parameter 420 is provided that indicates channel bandwidth for the particular transmission frequency. A WID parameter 422 is provided that identifies a wide area content descrambling sequence for descrambling wide area content carried on the particular transmission frequency. A LID parameter 424 is provided that identifies a local area content descrambling sequence for descrambling local area content carried on the particular transmission frequency. One or more reserved parameters 426 are provided at the end of the NDM message 400 for any suitable additional information.

If the NDM 400 is generated for a group of LOIs, a given LOI may be included as a neighbor LOI more than once in the NDM 400. For example if NDM 400 is generated for two neighboring LOIs, for instance LOI2 and LOI3 in FIG. 1, the LOI2 will be included twice in the NDM. The LOI2 will be included once as the reference LOI and once as the neighbor of LOI3. Similarly the LOI3 will be included once as reference LOI and once as a neighbor of LOI2. In an aspect, if a given LOI is included more than once in an NDM generated for a group of LOIs, the Frequency records 432 are included only once for that LOI to optimize NDM size. If this optimization is supported, the Frequency count field 414 is set to '0' for all those occurrences of a given LOI which do not specify Frequency records. The Frequency records 432 are always included for the Neighbor LOI Record 430 corresponding to the reference LOI (with the NeighborLOISameAsRefLOI flag 410 set to true). If the Frequency count field 414 is set to '0' for a LOI, the device determines Frequency records 432 for that neighbor LOI from other parts of the NDM message. Thus, an optimized NDM includes only one instance of frequency records for all RF channels associated with a given LOI. For example, if the frequency records are not included in the optimized NDM for a particular neighboring LOI of the device's current LOI, the device determines frequency records for that particular LOI from other parts of the optimized NDM message containing frequency records for that particular LOI.

As illustrated in FIG. 4, the NDM 400 is distributed over the LOI2 using a local control channel 434 that is part of the transmission frames transmitted by the RF channels in LOI2. It should be noted that the NDM 400 may be formatted in any suitable format, encoded or encrypted, and/or reorganized or divided into two or more message components.

A table 436 is shown that illustrates how parameters provided in the NDM 400 may be organized and stored at a device. The table 436 comprises a LOI identifier 438 that identifies the device's current LOI (i.e., LOI2). The table 436 also includes a Neighbor LOI List 440 that identifies neighboring LOIs of the device's current LOI plus the current LOI itself. The table 436 also includes RF channel identifiers 442, which indicate identifiers that may be used to reference to particular RF channels of the current LOI in other control channel messages. Note that the RF channel identifiers 442 are only provided for the current LOI (i.e., LOI2).

The table 436 also comprises RF Frequency identifiers 444 that identify RF frequencies associated with each LOI identified in the Neighbor LOI List 440. The table 436 also comprises WID/LID Identifiers 446 that identify WID/LID descrambling sequence identifiers associated with each RF Frequency 444. Thus, the table 436 may be created and stored at a receiving device and used during operation of the selection system.

Figure 5:
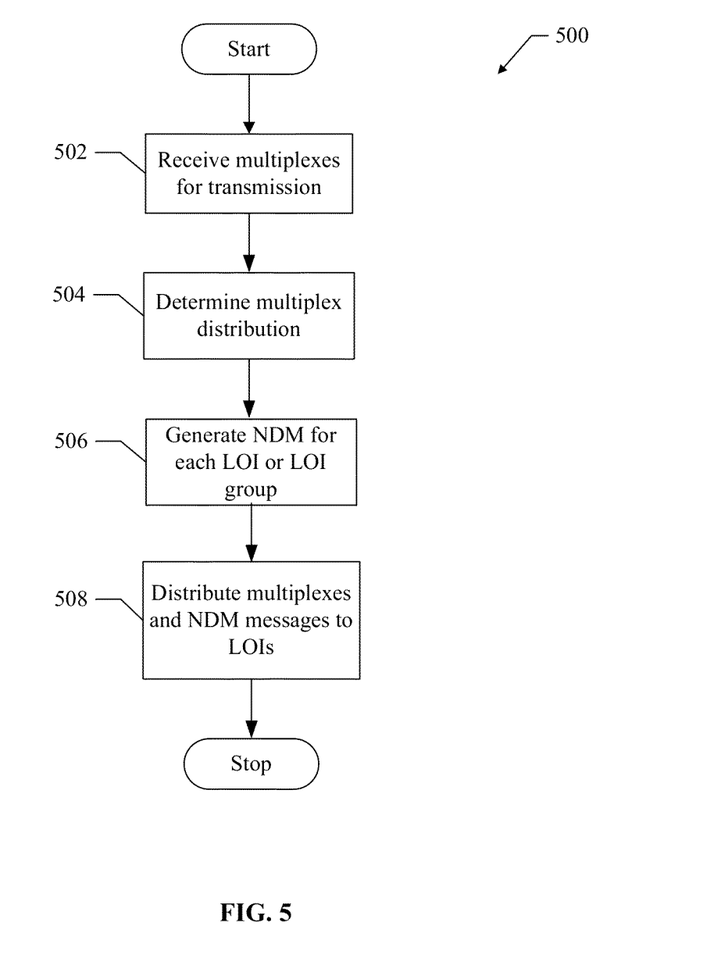
FIG. 5 shows a method for generating neighbor description messages for use in aspects of a selection system.

FIG. 5 shows a method 500 for generating neighbor description messages for use in aspects of a selection system. For clarity, the method 500 is described herein with reference to the aggregation logic 300 shown in FIG. 3. For example, in an aspect, the messaging logic 302 executes one or more sets of codes to control the aggregation logic 300 to perform the functions described below.

At block 502, one or more wide and/or local multiplexes are received for distribution over a multi-frequency network. For example, the multiplexes are received at the NOC 102 shown in FIG. 1.

At block 504, the distribution of the received multiplexes is determined. For example, the NOC 102 determines the distribution of the wide area and local area multiplexes to selected WOIs and LOIs. In an aspect, the NOC 102 determines which multiplexes are to be delivered to each LOI and the RF channels that are to be used to deliver the multiplexes within each LOI.

At block 506, NDM messages are generated for each LOI. For example, in an aspect, for each LOI in the distribution network, an NDM is generated that identifies the set of neighboring LOIs for that LOI and provides WID/LID identifiers for RF channels in that LOI and its neighboring LOIs. In another aspect, an NDM message is generated for any selected group of LOIs. For example, the messaging logic 302 operates to generate the NDM messages, which may be formatted as the NDM 400 illustrated in FIG. 4.

At block 508, the content multiplexes and NDM messages are distributed to transmitter sites for distribution to devices in each LOI. For example, the content multiplexes and NDM messages are transmitted to the transmitters using any suitable transport mechanism. From the transmitter sites the NDM messages are distributed over each LOI using local control channels that are provided by transmitted transmission frames as illustrated in FIG. 2.

Thus, the method 500 operates to generate neighbor description messages for use in aspects of a selection system. It should be noted that the method 500 represents just one implementation and that other implementations are possible within the scope of the aspects.

Figure 6:
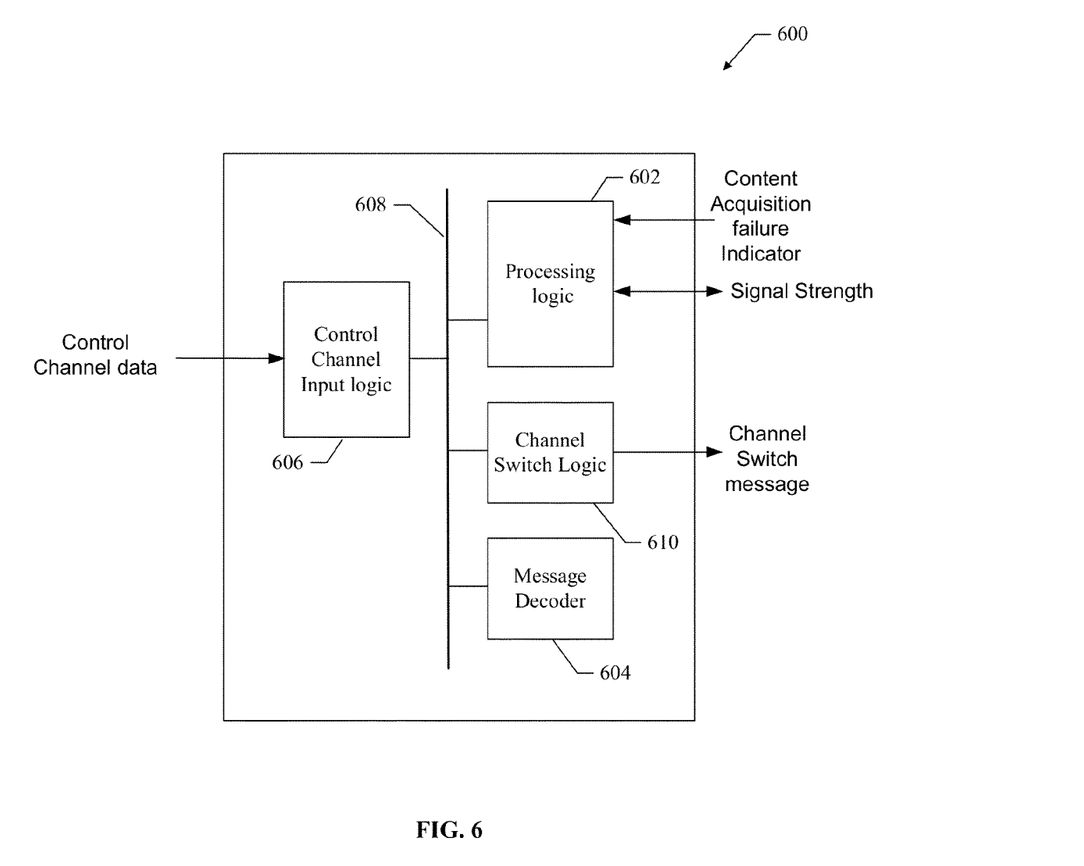
FIG. 6 shows RF channel selection logic for use in aspects of a selection system.

FIG. 6 shows RF channel selection logic 600 for use in aspects of a selection system. For example, the RF channel selection logic 600 is suitable for use as the RF channel selection logic 118 shown in FIG. 1. The RF channel selection logic 600 comprises processing logic 602, message decoder 604, channel switch logic 610, and control channel input logic 606 all coupled to a data bus 608.

The control channel input logic 606 comprises at least one of a CPU, processor, gate array, hardware logic, memory elements, and/or hardware executing software. The control channel input logic 606 operates to receive control channel data over an RF channel that a device is currently tuned to and passes this data to the message decoder 604. For example, an NDM message is received over a local control channel that is part of a transmission frame as illustrated in FIG. 2.

The message decoder 604 comprises at least one of a CPU, processor, gate array, hardware logic, memory elements, and/or hardware executing software. In an aspect, the message decoder 604 operates to decode an NDM message received over the control channel. For example, the message decoder 604 operates to decode the received NDM message to determine available RF channels associated with the current LOI and its neighboring LOIs. The message decoder 604 decodes the received NDM message to determine WID/LID descrambling sequence identifiers associated with each RF channel. For example, the NDM message is formatted as illustrated in FIG. 4 and is decoded to determine the WID/LID descrambling identifiers associated with RF channels in the current LOI and its neighbor LOIs. In an aspect, a table of RF channel information is organized and stored as illustrated by table 436. This information is passed to the processing logic 602.

The processing logic 602 comprises at least one of a CPU, processor, gate array, hardware logic, memory elements, and/or hardware executing software. In an aspect, the processing logic 602 operates to receive an indicator which indicates content acquisition failures for desired content because of changing network conditions (e.g. due to mobility) or other reasons. In such a case, it may be necessary to perform an RF channel switch to switch to an RF channel carried in a neighboring LOI to continue to receive the desired content.

The processing logic 602 is aware of the RF channel locations for content flows in the network. For example, a mapping between RF channels and available content flows may be transmitted over the control channel from the network operations center and is provided to the processing logic 602. When an RF channel switch is required because of content acquisition failure, the processing logic 602 determines a list of RF channels that carry the desired content. In an aspect, the processing logic 602 assembles the list to comprise those RF channels in neighboring LOIs that are associated with the WID/LID of the desired content flow.

Once the list of RF channels is determined, the processing logic 602 operates to sort the list based on available content in associated LOIs. For example, the processing logic 602 determines the amount of content available in a LOI by determining the number of unique WID/LID identifiers in each LOI. The processing logic 602 then selects the RF channel carrying the desired content and associated with the LOI having the most available content and which meets any desired signal strength criteria. For example, the processing logic 602 communicates with a receiver to determine the signal strength of one or more RF channels and uses this information to determine which RF channels in the list of RF channels meets the signal strength criteria. If none of the RF channels carrying the desired content satisfy the signal strength criteria, the processing logic 602 selects the RF channel with the highest signal strength, irrespective of the additional available content in the associated LOI. The processing logic 602 then sends an identifier of the selected RF channel and its associated WID/LID descrambling sequence identifiers obtained from the received NDM to the channel switch logic 610.

The channel switch logic 610 comprises at least one of a CPU, processor, gate array, hardware logic, memory elements, and/or hardware executing software and operates to generate a channel switch message that comprises the desired RF channel and the WID/LID descrambling sequence identifiers, and which is sent to the device receiver 116. With this information, the receiver 116 can quickly switch to the correct RF channel and use the correct WID/LID descrambling sequences to receive the desired content flow. Thus, during an RF channel switch initiated due to content acquisition failure for the desired content (e.g. because of device mobility), an RF channel can be selected that provides the desired content, meets the signal strength criteria, and which is associated with a LOI having the most additional content for an enhanced user experience.

In an aspect, the selection system comprises a computer program product having one or more program instructions ("instructions") or sets of "codes" stored on a machine-readable medium, which when executed by at least one processor, for instance, a processor at the processing logic 602, cause a computer to provide the functions described herein. For example, the sets of codes may be loaded into the RF channel selection logic 600 from a machine-readable medium, such as a floppy disk, CDROM, memory card, FLASH memory device, RAM, ROM, or any other type of memory device or machine-readable medium that interfaces to the RF switch logic 600. In another aspect, the sets of codes may be downloaded into the RF channel selection logic 600 from an external device or network resource. The sets of codes, when executed, cause a computer to provide aspects of a selection system as described herein.

Figure 7:
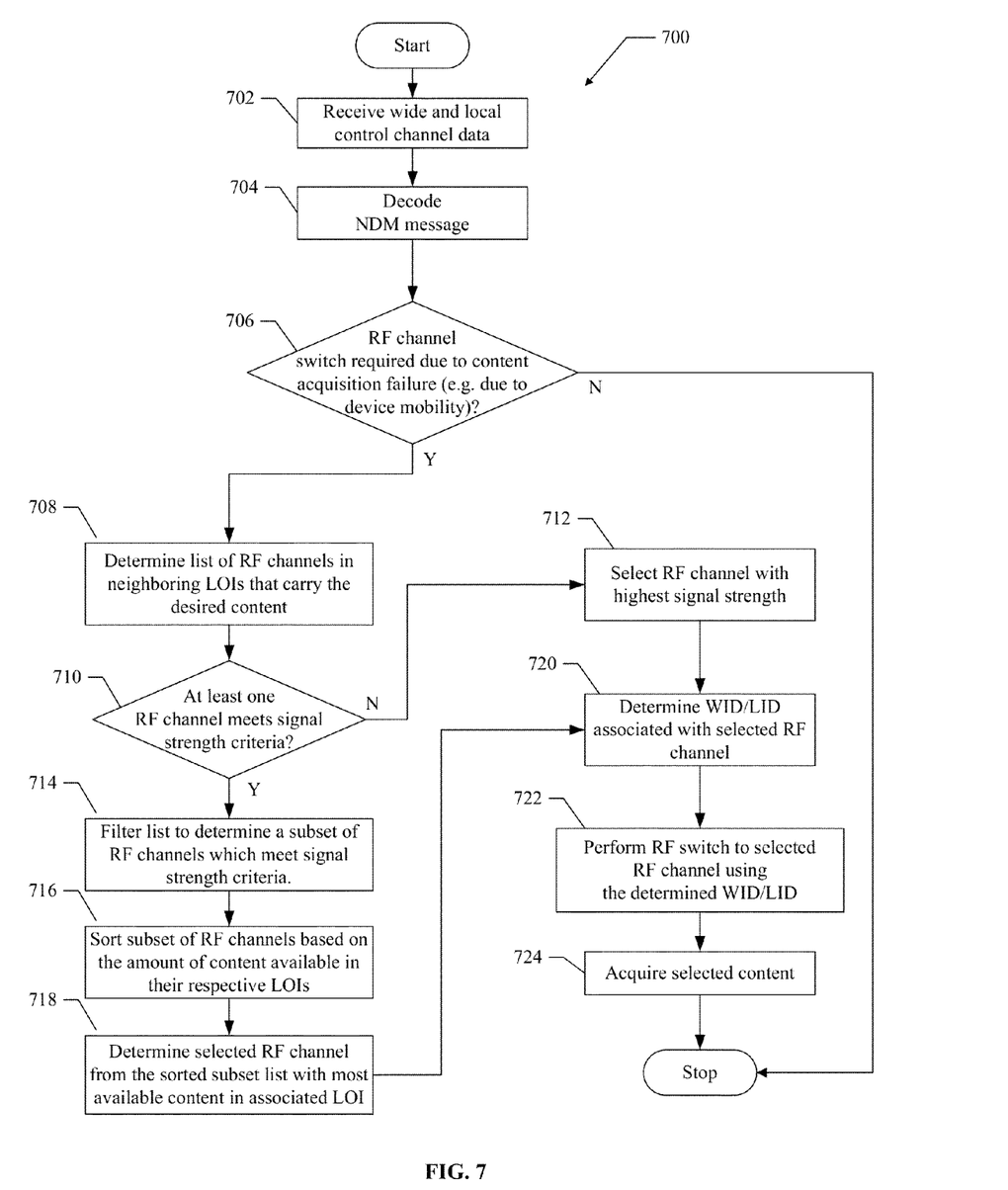
FIG. 7 shows a method for selecting an RF channel for use in aspects of a selection system.

FIG. 7 shows a method 700 for selecting an RF channel for use in aspects of a selection system. For clarity, the method 700 is described herein with reference to the RF channel selection logic 600 shown in FIG. 6. For example, in an aspect, the processing logic 602 executes one or more sets of codes to control the RF channel selection logic 600 to perform the functions described below.

At block 702, wide and local control channel data is received. In an aspect, the wide and local control channel data is received by the control channel input logic 606. For example, wide and local control channel data is received at a device in a sequence of transmission frames that are formatted as illustrated in FIG. 2.

At block 704, an NDM message received in the local control channel is decoded. In an aspect, the NDM message is formatted as illustrated in FIG. 4. The NDM message identifies the set of neighboring LOIs for the current LOI and associates RF channels with WID/LID descrambling sequence identifiers for RF channels in the current LOI and its neighboring LOIs. In an aspect, the information in the NDM message is stored at the device in a table as illustrated by table 436.

At block 706, a determination is made as to whether an RF channel switch is required due to content acquisition failures associated with desired content. In an aspect, the processing logic 602 operates to determine if an RF channel switch is required by detecting content acquisition failures e.g. due to device mobility. In an aspect, the receiving logic at the device indicates content acquisition failures by providing an indicator to the processing logic 602. The content acquisition failures may be because of changing network conditions or any other reason. If content acquisition failures are not detected, and therefore an RF channel switch is not needed, the method stops. If content acquisition failures are detected, and therefore an RF channel switch is required to continue to receive the desired content, the method proceeds to block 708.

At block 708, a list of RF channels in neighboring LOIs that carry the desired content flow is determined. In an aspect, the processing logic 602 operates to determine a selected list of RF channels carrying the desired content based on a received NDM. For example, RF channels in neighboring LOIs that utilize the same WID/LID identifiers as the current RF channel carry the desired content and are included in the list.

At block 710, a determination is made as to whether at least one RF channel in the selected list of RF channels meets desired signal strength criteria. For example, the processing logic 602 receives signal strength indicators associated with the RF channels in the list (i.e., from receiving logic at the device) and determines which RF channels meet any desired signal strength criteria. If no RF channel meets the signal strength criteria, the method proceeds to block 712. If at least one RF channel meets the signal strength criteria, the method proceeds to block 714.

At block 714, the selected list of RF channels is filtered to determine a subset of RF channels that meet the selected signal strength criteria. For example, the processing logic 602 communicates with a device receiver to determine the relative signal strengths of the selected list of RF channels and creates a subset of RF channels that meet the selected signal strength criteria.

At block 716, the subset of RF channels is sorted based on the amount of content available in their respective LOIs. In an aspect, the processing logic 602 operates to sort the subset of RF channels based on their associated LOIs having the most number of unique WID/LID identifiers, which indicates the amount of content carried in their associated LOIs.

At block 718, a selected RF channel is determined from the sorted subset of RF channels. In an aspect, the processing logic 602 operates to determine the selected RF channel from the sorted subset of RF channels that is associated with the LOI having the most available content (i.e., the LOI associated with the most number of unique WID/LID identifiers).

At block 712, a selected RF channel is determined from the list of RF channels based on the RF channel having the highest signal strength. In an aspect, the processing logic 602 operates to select the RF channel having the highest signal strength from the list of RF channels determined at block 708.

At block 720, WID/LID identifiers associated with the selected RF channel are determined. In an aspect, the processing logic 602 operates to determine the WID/LID identifiers by using information provided in the NDM to determine which WID/LID identifiers are associated with the selected RF channel. For example, the NDM is formatted as illustrated in FIG. 4 and provides a mapping between RF channels and WID/LID identifiers in the current LOI and its neighboring LOIs. The processing logic 602 operates to determine the WID/LID identifiers associated with the selected RF channel from this mapping.

At block 722, a switch to the selected RF channel is performed and determined WID/LID identifiers are used to descramble content on the new RF channel. In an aspect, the channel switch logic 610 operates to generate a channel switch message that identifies the new RF channel and sends this message to receiving logic at the device. The channel switch message identifies the selected RF channel and its associated WID/LID descrambling sequence identifiers. The receiver then tunes to the new RF channel and uses the WID/LID identifiers to determine the correct descrambling sequences with which to descramble received transmission frames. At block 724, the content received from the descrambled transmission frames is decoded and rendered at the device.

Thus, the method 700 operates to select an RF channel for use in aspects of a selection system. It should be noted that the method 700 represents just one implementation and that other implementations are possible within the scope of the aspects.

Figure 8:
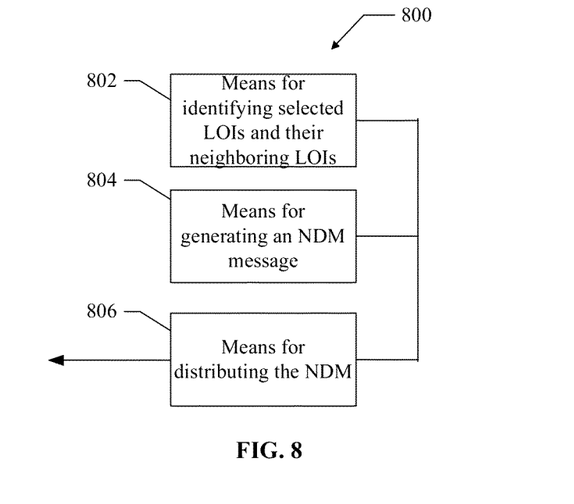
FIG. 8 shows aggregation logic for use in aspects of a selection system.

FIG. 8 shows aggregation logic 800 for use in aspects of a selection system. For example, the aggregation logic 800 is suitable for use as the aggregation logic 300 shown in FIG. 3. In an aspect, the aggregation logic 800 is implemented by at least one integrated circuit comprising one or more modules configured to provide aspects of a selection system as described herein. For example, in an aspect, each module comprises hardware and/or hardware executing software.

The aggregation logic 800 comprises a first module comprising means (802) for identifying one or more selected local operations infrastructures (LOIs) and one or more neighboring LOIs for each of the one or more selected LOIs in the multi-frequency network, which in an aspect comprises the messaging logic 302. The aggregation logic 800 also comprises a second module comprising means (804) for generating a neighbor description message (NDM) that identifies the one or more selected LOIs and their respective neighboring LOIs, and associates at least one descrambling sequence identifier with each radio frequency (RF) channel associated with each of the one or more selected LOIs and their respective neighboring LOIs, which in an aspect comprises the messaging logic 302. The aggregation logic 800 also comprises a third module comprising means (806) for distributing the NDM over the one or more selected LOIs, which in an aspect comprises the output logic 308.

Figure 9:
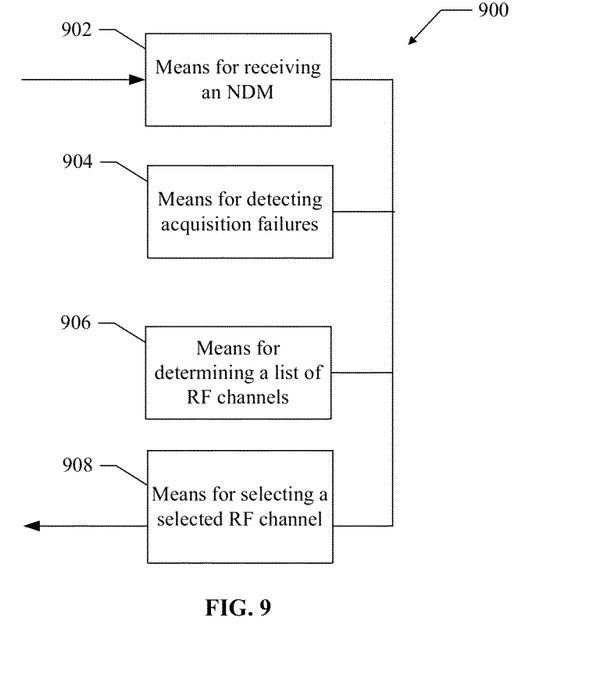
FIG. 9 shows RF channel selection logic for use in aspects of a selection system.

FIG. 9 shows RF channel selection logic 900 for use in aspects of a selection system. For example, the RF channel selection logic 900 is suitable for use as the RF channel selection logic 600 shown in FIG. 6. In an aspect, the RF channel selection logic 600 is implemented by at least one integrated circuit comprising one or more modules configured to provide aspects of a selection system as described herein. For example, in an aspect, each module comprises hardware and/or hardware executing software.

The RF channel selection logic 900 comprises a first module comprising means (902) for receiving a NDM that identifies RF channels associated with a first LOI and one or more neighboring LOIs of the first LOI, and wherein each RF channel is associated with at least one descrambling sequence identifier, which in an aspect comprises the control channel input logic 606. The RF channel selection logic 900 also comprises a second module comprising means (904) for detecting content acquisition failures associated with desired content, which in an aspect comprises the processing logic 602. The RF channel selection logic 900 also comprises a third module comprising means (906) for determining a list of RF channels and their associated LOIs from the one or more neighboring LOIs that carry the desired content, which in an aspect comprises the processing logic 602. The RF channel selection logic 900 also comprises a fourth module comprising means (908) for selecting a selected RF channel from the list of RF channels, wherein the selected RF channel is associated with a selected LOI that carries the most additional content among the associated LOIs, which in an aspect comprises the processing logic 602.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of selection system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for RF channel selection in a multi-frequency network, the method comprising:
 receiving a neighbor description message (NDM) that identifies radio frequency (RF) channels associated with a first local operations infrastructure (LOI) and one or more neighboring LOIs of the first LOI, and wherein each RF channel is associated with at least one descrambling sequence identifier;
 detecting content acquisition failures associated with desired content;
 determining a list of RF channels carrying the desired content and their associated LOIs from the one or more neighboring LOIs; and
 selecting a selected RF channel from the list of RF channels, wherein the selected RF channel is associated with a selected LOI that carries the most additional content among the associated LOIs.

2. The method of claim 1, further comprising switching to the selected RF channel to acquire the desired content using a selected descrambling sequence identifier associated with the selected RF channel.

3. The method of claim 1, wherein the at least one descrambling sequence identifier comprises at least one of a wide area sequence identifier (WID) and a local area sequence identifier (LID).

4. The method of claim 1, wherein said receiving comprises receiving an optimized NDM that includes only one instance of frequency records for all RF channels associated with a given LOI.

5. The method of claim 1, wherein said determining comprises determining the list of RF channels carrying the desired content and their associated LOIs from information in the optimized NDM.

6. The method of claim 1, wherein said receiving comprises receiving the NDM over a control channel.

7. The method of claim 1, wherein the selected LOI is associated with the greatest number of unique descrambling sequence identifiers among the associated LOIs.

8. The method of claim 1, wherein said selecting comprises:
  filtering the list of RF channels to produce a filtered list of RF channels and associated filtered LOIs, wherein the filtered list of RF channels meet a signal strength criteria; and
  selecting the selected RF channel from the filtered list of RF channels, wherein the selected RF channel is associated with a selected filtered LOI that is associated with the greatest number of unique descrambling sequence identifiers among the filtered LOIs.

9. An apparatus for RF channel selection in a multi-frequency network, the apparatus comprising:
  a message decoder configured to receive a neighbor description message (NDM) that identifies radio frequency (RF) channels associated with a first local operations infrastructure (LOI) and one or more neighboring LOIs of the first LOI, and wherein each RF channel is associated with at least one descrambling sequence identifier; and
  processing logic configured to detect content acquisition failures associated with desired content, determine a list of RF channels carrying the desired content and their associated LOIs from the one or more neighboring LOIs, and select a selected RF channel from the list of RF channels, wherein the selected RF channel is associated with a selected LOI that carries the most additional content among the associated LOIs.

10. The apparatus of claim 9, further comprising channel switch logic configured to switch to the selected RF channel to acquire the desired content using a selected descrambling sequence identifier associated with the selected RF channel.

11. The apparatus of claim 9, wherein the at least one descrambling sequence identifier comprises at least one of a wide area sequence identifier (WID) and a local area sequence identifier (LID).

12. The apparatus of claim 9, wherein said message decoder is configured to receive an optimized NDM that includes only one instance of frequency records for all RF channels associated with a given LOI.

13. The apparatus of claim 9, wherein said processing logic is configured to determine the list of RF channels carrying the desired content and their associated LOIs from information in the optimized NDM.

14. The apparatus of claim 9, wherein said message decoder is configured to receive the NDM over a control channel.

15. The apparatus of claim 9, wherein the selected LOI is associated with the greatest number of unique descrambling sequence identifiers among the associated LOIs.

16. The apparatus of claim 9, wherein said processing logic is configured to:
  filter the list of RF channels to produce a filtered list of RF channels and associated filtered LOIs, wherein the filtered list of RF channels meet a signal strength criteria; and
  select the selected RF channel from the filtered list of RF channels, wherein the selected RF channel is associated with a selected filtered LOI that is associated with the greatest number of unique descrambling sequence identifiers among the filtered LOIs.

17. An apparatus for RF channel selection in a multi-frequency network, the apparatus comprising:
  means for receiving a neighbor description message (NDM) that identifies radio frequency (RF) channels associated with a first local operations infrastructure (LOI) and one or more neighboring LOIs of the first LOI, and wherein each RF channel is associated with at least one descrambling sequence identifier;
  means for detecting content acquisition failures associated with desired content;
  means for determining a list of RF channels carrying the desired content and their associated LOIs from the one or more neighboring LOIs; and
  means for selecting a selected RF channel from the list of RF channels, wherein the selected RF channel is associated with a selected LOI that carries the most additional content among the associated LOIs.

18. The apparatus of claim 17, further comprising means for switching to the selected RF channel to acquire the desired content using a selected descrambling sequence identifier associated with the selected RF channel.

19. The apparatus of claim 17, wherein the at least one descrambling sequence identifier comprises at least one of a wide area sequence identifier (WID) and a local area sequence identifier (LID).

20. The apparatus of claim 17, wherein said means for receiving comprises means for receiving an optimized NDM that includes only one instance of frequency records for all RF channels associated with a given LOI.

21. The apparatus of claim 17, wherein said means for determining comprises means for determining the list of RF channels carrying the desired content and their associated LOIs from information in the optimized NDM.

22. The apparatus of claim 17, wherein said means for receiving comprises means for receiving the NDM over a control channel.

23. The apparatus of claim 17, wherein the selected LOI is associated with the greatest number of unique descrambling sequence identifiers among the associated LOIs.

24. The apparatus of claim 17, wherein said means for selecting comprises:
  means for filtering the list of RF channels to produce a filtered list of RF channels and associated filtered LOIs, wherein the filtered list of RF channels meet a signal strength criteria; and
  means for selecting the selected RF channel from the filtered list of RF channels, wherein the selected RF channel is associated with a selected filtered LOI that is associated with the greatest number of unique descrambling sequence identifiers among the filtered LOIs.

25. A non-transitory computer-readable storage medium having stored thereon processor-executable instructions configured to cause a processor to perform RF channel selection operations in a multi-frequency network comprising:
  receiving a neighbor description message (NDM) that identifies radio frequency (RF) channels associated with a first local operations infrastructure (LOI) and one or more neighboring LOIs of the first LOI, wherein each RF channel is associated with at least one descrambling sequence identifier;
  detecting content acquisition failures associated with desired content;
  determining a list of RF channels carrying the desired content and their associated LOIs from the one or more neighboring LOIs; and
  selecting a selected RF channel from the list of RF channels, wherein the selected RF channel is associated with a selected LOI that carries the most additional content among the associated LOIs.

26. The non-transitory computer-readable storage medium of claim 25, wherein the stored processor-executable instructions are configured to cause a processor to perform RF channel selection operations further comprising:
  switching to the selected RF channel to acquire the desired content using a selected descrambling sequence identifier associated with the selected RF channel.

27. The non-transitory computer-readable storage medium of claim 25, wherein the stored processor-executable instructions are configured to cause a processor to perform RF channel selection operations such that:
  at least one descrambling sequence identifier comprises at least one of a wide area sequence identifier (WID) and a local area sequence identifier (LID).

28. The non-transitory computer-readable storage medium of claim 25, wherein the stored processor-executable instructions are configured to cause a processor to perform RF channel selection operations such that:
  receiving the NDM comprises receiving an optimized NDM that includes only one instance of frequency records for all RF channels associated with a given LOI.

29. The non-transitory computer-readable storage medium of claim 25, wherein the stored processor-executable instructions are configured to cause a processor to perform RF channel selection operations such that:
  the list of RF channels carrying the desired content and their associated LOIs is determined from information in the optimized NDM.

30. The non-transitory computer-readable storage medium of claim 25, wherein the stored processor-executable instructions are configured to cause a processor to perform RF channel selection operations such that:
  the NDM is received over a control channel.

31. The non-transitory computer-readable storage medium of claim 25, wherein the stored processor-executable instructions are configured to cause a processor to perform RF channel selection operations such that:
  the selected LOI is associated with the greatest number of unique descrambling sequence identifiers among the associated LOIs.

32. The non-transitory computer-readable storage medium of claim 25, wherein the stored processor-executable instructions are configured to cause a processor to perform RF channel selection operations such that selecting a selected RF channel from the list of RF channels comprises:
  filtering the list of RF channels to produce a filtered list of RF channels and associated filtered LOIs, wherein the filtered list of RF channels meet a signal strength criteria; and
  selecting the selected RF channel from the filtered list of RF channels, wherein the selected RF channel is associated with a selected filtered LOI that is associated with the greatest number of unique descrambling sequence identifiers among the filtered LOIs.

33. At least one integrated circuit configured to perform a method for RF channel selection in a multi-frequency network, the at least one integrated circuit comprising:
  a first module configured to receive a neighbor description message (NDM) that identifies radio frequency (RF) channels associated with a first local operations infrastructure (LOI) and one or more neighboring LOIs of the first LOI, and wherein each RF channel is associated with at least one descrambling sequence identifier;
  a second module configured to detect content acquisition failures associated with desired content;
  a third module configured to determine a list of RF channels carrying the desired content and their associated LOIs from the one or more neighboring LOIs; and
  a fourth module configured to select a selected RF channel from the list of RF channels, wherein the selected RF channel is associated with a selected LOI that carries the most additional content among the associated LOIs.

34. The at least one integrated circuit of claim 33, further comprising a fifth module configured to switch to the selected RF channel to acquire the desired content using a selected descrambling sequence identifier associated with the selected RF channel.

35. The at least one integrated circuit of claim 33, wherein the at least one descrambling sequence identifier comprises at least one of a wide area sequence identifier (WID) and a local area sequence identifier (LID).

36. The at least one integrated circuit of claim 33, wherein said first module is configured to receive the NDM over a control channel.

37. The at least one integrated circuit of claim 33, wherein said first module is configured to receive an optimized NDM that includes only one instance of frequency records for all RF channels associated with a given LOI.

38. The at least one integrated circuit of claim 33, wherein said third module is configured to determine the list of RF channels carrying the desired content and their associated LOIs from information in the optimized NDM.

39. The at least one integrated circuit of claim 33, wherein the selected LOI is associated with the greatest number of unique descrambling sequence identifiers among the associated LOIs.

40. The at least one integrated circuit of claim 33, wherein said fourth module is configured to:
  filter the list of RF channels to produce a filtered list of RF channels and associated filtered LOIs, wherein the filtered list of RF channels meet a signal strength criteria; and
  select the selected RF channel from the filtered list of RF channels, wherein the selected RF channel is associated with a selected filtered LOI that is associated with the greatest number of unique descrambling sequence identifiers among the filtered LOIs.

* * * * *